United States Patent [19]
Flynn et al.

[11] Patent Number: 5,403,387
[45] Date of Patent: Apr. 4, 1995

[54] APPARATUS FOR REMOVING MOISTURE FROM A GAS

[75] Inventors: Paul E. Flynn, Wernersville; David L. Weaver, Sinking Spring, both of Pa.

[73] Assignee: Reading Technologies, Inc., Reading, Pa.

[21] Appl. No.: 755,694

[22] Filed: Sep. 6, 1991

[51] Int. Cl.⁶ .......................................... B01D 53/04
[52] U.S. Cl. ........................................ 96/143; 96/149; 96/151
[58] Field of Search ................... 55/179, 208, 316, 387, 55/389; 96/121, 122, 126–128, 130, 131, 134, 135, 143–146, 149, 151

[56] References Cited

U.S. PATENT DOCUMENTS

| | | | |
|---|---|---|---|
| 2,758,719 | 8/1956 | Line | 55/387 X |
| 3,258,899 | 7/1966 | Coffin | 55/179 X |
| 3,323,292 | 6/1967 | Brown | 55/179 X |
| 3,353,339 | 11/1967 | Walter | 55/387 X |
| 4,231,768 | 11/1980 | Seibert et al. | 55/316 X |
| 4,322,228 | 3/1982 | Myers et al. | 55/389 X |
| 4,373,938 | 2/1983 | McCombs | 55/389 X |
| 4,659,467 | 4/1987 | Spearman | 55/389 X |
| 4,822,387 | 4/1989 | Daniels | 55/323 |
| 4,986,840 | 1/1991 | Mori et al. | 55/387 X |

FOREIGN PATENT DOCUMENTS

| | | | |
|---|---|---|---|
| 932273 | 8/1973 | Canada | 55/387 |
| 852538 | 10/1952 | Germany | 55/387 |
| 2854710 | 7/1980 | Germany | 55/387 |
| 52-054682 | 5/1977 | Japan | 55/387 |

Primary Examiner—Robert Spitzer
Attorney, Agent, or Firm—Eckert Seamans Cherin & Mellott

[57] ABSTRACT

A moisture removal device for compressed air lines and the like includes a connection head having a gas inlet and a gas outlet. An elongated housing having an internal cavity is threaded to the connection head and sealed thereto with O-rings such that a central distribution tube is coupled to one of the inlet and the outlet and an open end of the housing is coupled to the other. The housing contains desiccant material for removing moisture from the gas, held captive in the housing by a retention screen across the open end. The distribution tube is impermeable between its end coupled to the connection head and one or more openings at the opposite end of the housing. The gas thus flows from the gas inlet through the entire bed of desiccant material and is discharged through the gas outlet in the connection head.

12 Claims, 3 Drawing Sheets

APPARATUS FOR REMOVING MOISTURE FROM A GAS

BACKGROUND OF THE INVENTION

1. Field of the Invention

The invention relates to apparatus for removing moisture from a gas, and in particular, to a moisture removal apparatus for a compressed air line, having a series of moisture traps including a renewable desiccant material. The desiccant material is contained in an easily replaced canister having means to retain the desiccant when the canister is removed for rejuvenation, for example by baking.

2. Prior Art

It is often desirable to provide air or other gases having relatively low humidity for use in a device or a process. One example is a compressed air supply for a spray painting process, where it is necessary to ensure that no water becomes mixed with the paint. It is especially important to remove water droplets from the air supply, and inasmuch as pressure changes along a flow path can produce condensation, it is desirable to ensure a low relative humidity. Many devices are known for removing water from gaseous fluids. Such devices are generally one of two types. One type relies on the pattern and velocity of the gas flowing through the device to cause water droplets to accumulate at a particular trap area within the device. The water droplets are extracted, for example, at a reversal of the flow path directing droplets into a trap, and the trap can be drained via a valve. Such a device removes droplets but does not reduce the humidity of the gas.

The other type of moisture removal device passes the gas through a body of material which absorbs water. Filter pads can accumulate water in capillary passages defined between fibers, or a desiccant material can be provided to remove moisture from the passing gas. These dryers eventually become saturated with water, but can be rejuvenated by heating the material to a high enough temperature to drive off the moisture. Desiccant type dryers having a replaceable canister containing desiccant material are known. When the desiccant becomes saturated, the canister is typically removed and returned to a regeneration facility, and replaced by a canister containing fresh desiccant material. The regeneration facility typically reloads the returned canister with fresh desiccant, and so on.

An absorptive or desiccant dryer typically has a connection head including an inlet and an outlet for relatively permanent mounting in a fluid flow system. A desiccant-containing canister having an inlet and an outlet is removably attached to the head. The canister is generally cylindrical in shape, and in order to provide a large area of contact and minimal flow restriction the desiccant fills an annular space between an inner wall of the canister and a central passageway. The central passageway is perforated over its length and leads to the inlet or outlet. Gas flows from the connection head into the canister, and partially through the desiccant material, exiting the central passageway at any point along its perforated length. Known desiccant dryers do not efficiently utilize the desiccant material because all the gas is not forced to flow through the entire desiccant bed. Instead, the length of the flow path through the desiccant bed varies with the point at which the gas passes between the desiccant and the perforated central passageway or tube.

The present invention provides a desiccant type dryer in a moisture removal apparatus, the desiccant portion having a replaceable canister containing renewable desiccant material captured between an end screen, the wall of the canister and a tube having openings distributed at one end of the tube. The end screen and the opposite end of the tube communicate with the inlet and outlet via particular seal structures associated with the canister top, defining a flow path for the gas which causes all the gas to flow through the entire length of the desiccant bed in the canister. The desiccant dryer is preferably provided as an element in series with a non-absorptive coalescent filter element as disclosed in U.S. Pat. No. 4,822,387, which is hereby incorporated, and in series with a pad-type absorptive filter. The apparatus effectively removes water droplets and water vapor, and is particularly useful for high performance applications such as spray painting and other critical pneumatic systems that cannot tolerate moisture contamination.

SUMMARY OF THE INVENTION

It is an object of the invention to provide an apparatus for efficiently removing moisture from a gas.

It is a further object of the invention to provide a moisture removal apparatus having a conveniently replaceable housing containing a drying agent.

It is another object of the invention to provide a moisture removal apparatus having a renewable drying agent which is captive in a canister which can be readily removed and baked as a whole, for rejuvenating the drying agent without the need to reload the canister.

It is yet another object of the invention to provide a moisture removal apparatus which provides a gas flow path intersecting a maximum volume of drying agent contained in a canister.

It is still another object of the invention to provide a convenient arrangement of conduits and seals in a desiccant canister coupled in a multi-element filter arrangement, whereby the desiccant canister can be simply threaded onto and off of a connection head, and internally defines a gas flow path which passes through a full volume of desiccant beads captured between the canister, an internal tube and an end screen.

These and other objects are accomplished by an apparatus having a connection head defining a gas inlet, a gas outlet, and a closure surface. The gas inlet and the gas outlet each extend through the connection head to an inlet port and an outlet port, respectively, in the closure surface An elongated housing having walls defines an internal cavity. The housing has an open end and an opposite end. The housing is removably attached to the connection head such the closure surface sealingly covers the open end. A distribution tube is disposed within the cavity. The distribution tube has one end defining an inlet in communication with the gas inlet of the connection head, and an other end defining an outlet disposed near the opposite end of the housing. An internal passageway in the distribution tube connects the inlet and the outlet such that gas passes between the internal passageway and the desiccant material only at an end remote from the connection head. A desiccant material such as a quantity of loose silica gel beads substantially fills the cavity between the distribution tube and the housing. The gas moves through the apparatus along a path through the gas inlet, through the distribution tube, through the entire length of the desiccant material and through the gas outlet.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
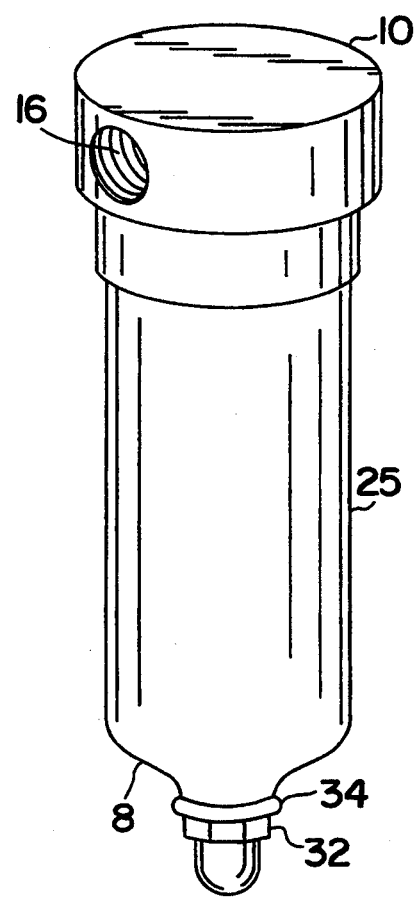
FIG. 1 is a perspective view of an apparatus for removing moisture from a gas according to the invention.
Figure 2:
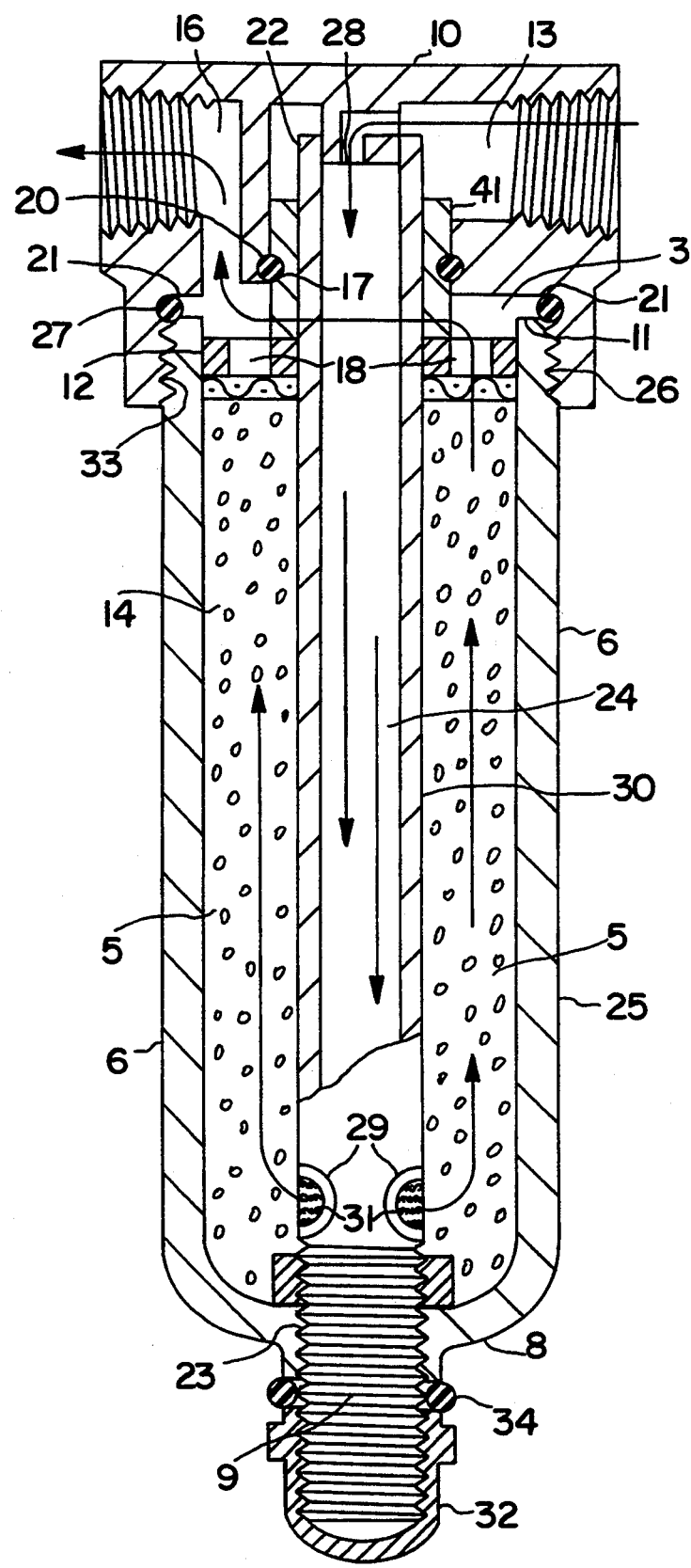
FIG. 2 is a cross-sectional view of the moisture removal apparatus according to the invention showing a gas flow path through the apparatus.

An apparatus for removing moisture from a gas according to the invention as shown in FIGS. 1 and 2 includes an elongated housing 25 having walls 6 defining an internal cavity 14. The elongated housing 25 has an open end 3 and an opposite end 8. A connection head 10 defines a gas inlet 13, a gas outlet 16, and a closure surface 21. The housing 25 defines a canister which is removably attached to the connection head 10 such that the closure surface 21 sealingly covers the open end 3 around an upper edge 11 of the walls 6. Sealing means including O-ring 27 are provided to prevent gas leakage between the housing 25 and the closure surface 21. The sealing means are compressed between the respective portions of the canister and the connection head when the canister is coupled to the connection head, preferably being threaded such that the canister can be readily spun on or off the connection head to effect replacement or removal for regeneration of the desiccant material.

Figure 3:
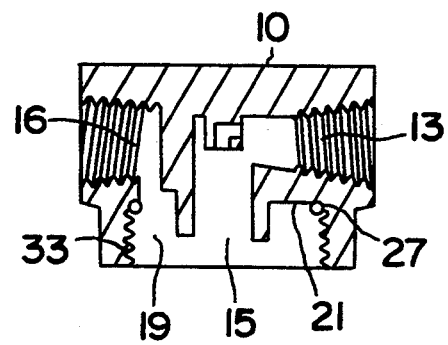
FIG. 3 is a cross-sectional view of a connection head for the moisture removal apparatus according to the invention.

As shown in FIG. 3, the gas inlet 13 defines a flow path extending through the connection head 10 to inlet port 15 in the closure surface 21. The gas outlet 16 similarly defines a path extending through the head 10 to an outlet port 19 in the closure surface. The gas inlet 13 and the gas outlet 16 may be defined in any external surface of the head 10. Preferably, the gas inlet 13 and the gas outlet 16 are collinear, for example aligned on diametrically opposite sides of the head 10, so that the head can be installed in a straight line section of a fluid system.

A distribution tube 30 is disposed within the cavity 14. The distribution tube 30 has one end 22 defining an inlet 28 in communication with the gas inlet 13 of the connection head 10. An other end of the distribution tube 30 defines an outlet 29 disposed near the opposite end 8 of the housing 25. The outlet 29 is preferably provided by a number of orifices spaced circumferentially around the wall of the distribution tube 30, all located at the end remote from the connection head 10. Between the inlet and the outlet the tube is not perforated, and therefore carries the gas from the inlet to the point most remote from the connection head before the gas is released into the desiccant material. The tube 30 thus defines a closed internal passageway 24 between the inlet 28 and the outlet 29 for passage of the gas therethrough.

A desiccant material 5 is disposed within the housing 25 and substantially fills the cavity 14 between the distribution tube 30 and the walls 6 of the housing to form a desiccant bed. The gas enters the apparatus through the gas inlet 13 and enters the inlet 28 of the distribution tube 30. The gas flows through the passageway 24 and is released into the desiccant material 5 through the outlet 29 near the opposite end 8 of the housing 25. The gas must flow through the entire length of the desiccant bed in order to exit the apparatus through the outlet port 19 and the gas outlet 16.

The desiccant material 5 may be any suitable moisture adsorbing material. Such materials have a strong affinity for water molecules and remove water vapor from a gaseous fluid by binding the water vapor molecules which come into contact with the desiccant material surface. Thus, it is preferred that the desiccant material 5 have as large a surface area as possible for removing a maximum amount of the water vapor from the gas. The desiccant material is preferably a quantity of small silica gel beads which are loosely captive in the cavity. Depending on flow rates the beads can be agitated by the passage of the gas, but in any event the surfaces of the beads are disposed in contact with the passing gas for extracting moisture and reducing the relative humidity of the gas. Preferably, the desiccant material comprises silica gel beads having a diameter of approximately one-eighth inch, which provides a large surface contact area for adsorbing the maximum amount of moisture from the gas flowing therethrough. It is also possible to use other forms of desiccant material, for example activated alumina, molecular sieve material, or combinations of such desiccants.

In a preferred embodiment as shown in FIG. 2, the housing 25 is elongated along an elongation axis. The opposite end 8 of the housing 25 defines a threaded opening 23 coaxial with the elongation axis. The distribution tube 30 has threaded ends. The threaded other end 9 of the distribution tube engages the threaded opening 23, and the distribution tube is disposed substantially along the elongation axis. The distribution tube 30 is surrounded by the desiccant material 5 forming an annular bed. The distribution tube outlet 29 defines a number of orifices disposed around the circumference of the distribution tube near the opposite end 8 of the housing. The gas flows through the annular bed of the desiccant material 5 and the moisture removal efficiency is high due to good surface contact of the gas with the desiccant material. The distribution tube 30 is removable from the housing 25 by unscrewing acorn nut 32 from the threads on the opposite end 8 of the distribution tube, and unscrewing the tube from the threaded opening 23. A seal such as O-ring 34 may be provided for preventing leakage of the gas between the distribution tube 30 and the threaded opening 23.

The distribution tube 30 according to the preferred embodiment is fixed relative to the housing at both opposite ends. This is a convenient arrangement in connection with a housing with a threaded opening for end 8 of the distribution tube. It is also possible to use a canister which is closed at the end, and to suspend the distribution tube from its connection at the end adjacent the connection head.

A retaining means such as wire mesh screen 31 is provided for confining the desiccant material within the cavity. The wire mesh screen 31 prevents passage of desiccant particles while permitting passage of the gas therethrough. The wire mesh screen 31 is held in place by a retention support 12 which is threaded to the one end 22 of the distribution tube 30. The retention support 12 defines a plurality of orifices 18 to permit dry gas to flow into the gas outlet 16. The retention support 12 has a portion 41 extending upwardly through the inlet port 15 and disposed within the gas inlet 13. The upwardly extending portion 41 defines a groove 17 for an O-ring seal 20 to prevent bypass leakage of the moist inlet gas into the dried outlet gas.

The retention means including screen 31 and retention support 12 are arranged to remain in place on the housing when the housing is removed from the connection head. As a result, the desiccant remains captive in the housing and the housing can be removed in the manner of a removable and replaceable cartridge. The cartridge is preferably made of heat-tolerant materials (e.g., steel, aluminum or other metal, or high temperature plastic, ceramic or glass), whereby the cartridge can be baked as a whole, to rejuvenate the desiccant without the need to remove the desiccant from the housing. Any seals which remain on the housing when removed are likewise made of a heat tolerant material.

The openings in the distribution tube can be slightly smaller than the desiccant beads, to prevent the desiccant beads from entering the distribution tube, for example when the canister is inverted. Alternatively, the desiccant beads can be kept out of the distribution tube by placing a small plug of permeable material such as stainless steel mesh in the distribution tube adjacent the openings.

Preferably, the housing 25 is a cast cylindrical bowl having external threads 26 at the open end which engage with internal threads 33 defined in the head 10. The threads 26 allow the O-ring seals to be compressed between the connection head and the housing structures when tightened down. When the desiccant material 5 becomes saturated with moisture, the housing 25 can be unscrewed from the head 10, and another housing having new or renewed desiccant material 5 can be attached to the head.

Saturated desiccant material can be renewed repeatedly by baking, for example at 375° F. for 10–15 minutes, to drive off absorbed moisture and renew the ability of the desiccant material to absorb more. The retention screen arrangement of the invention as shown exposes the desiccant material to air circulation, however it is also possible to blow hot dry air through the device to better effect rejuvenation of the desiccant. The desiccant can be renewed approximately 5 or 6 times before its absorption efficiency is reduced so as to make further renewal impractical, whereupon the canister can be disassembled by removing the retention support and screen, and the desiccant beads can be replaced. The retention support is preferably threaded into the extreme upper end of the housing, either via external threads on the distribution tube, internal threads on the housing, or both.

Figure 4:
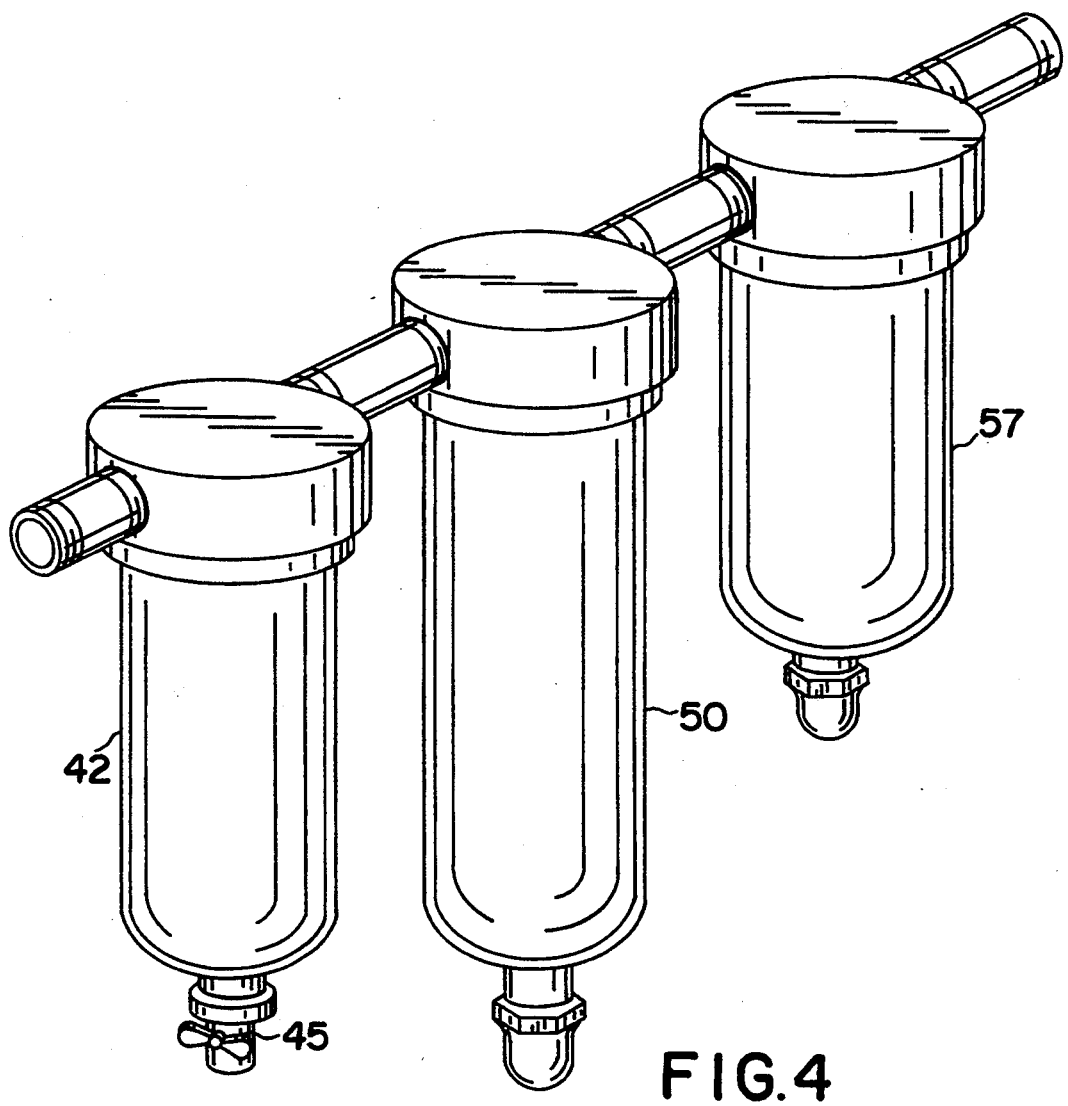
FIG. 4 is a perspective view of a gas filtering and drying system according to the invention.

The moisture removal apparatus according to the invention is preferably an element in a gas filtering and drying system. As shown in FIG. 4, the system includes a primary filter 42 which may be any suitable filter known in the art and effective to remove water droplets. Preferably, the primary filter 42 is a combination dryer/filter as disclosed in applicant's U.S. Pat. No. 4,822,387, including a coalescent material and an absorptive pad in a stacked arrangement in a central tube, with a narrow annular flow path defined downwardly in the filter housing, around a sharp reversal, and axially upwardly through the coalescent material (e.g., stainless steel mesh rolled into a plug) and through the absorptive pad (e.g., a cotton fiber plug). An air gap can be defined between the coalescent and absorptive materials to prevent wicking effects. The combination dryer/filter utilizes the reversal of flow to remove a portion of the moisture in the gas. The larger cross section of the axial path compared to the annular one also reduces gas velocity, aids in producing condensation, and reduces the tendency of water droplets captured by the coalescent filter to become re-entrained in the gas. The condensate is collected in a bottom of the dryer/filter housing and is drained through a drain valve 45.

Downstream of the coalescent material along the flow path, the gas in the primary filter is filtered through the filter pad to remove solid particulate material and to absorb any water droplets which pass the coalescent material. The system further includes the moisture removal apparatus 50, and an after-filter means 57, which removes desiccant dust particles from the gas. The gas filtering and drying system can be installed in a branch of a compressed gas system to supply clean, dry gas for specific applications, thus avoiding the need to clean and dry all of the compressed gas in a large system. Preferably the system is disposed in close proximity to the station at which the gas will be used, for example at a paint spraying booth or the like.

The invention having been disclosed, a number of variations will now become apparent to persons skilled in the art. The invention is intended to encompass not only the preferred embodiments mentioned above, but also a reasonable range of equivalents. Reference should be made to the appended claims rather than the foregoing discussion of preferred examples, in order to asses the scope of the invention in which exclusive rights are claimed.

We claim:

1. An apparatus for removing moisture from a gas, comprising:
    a connection head defining a gas inlet, a gas outlet, and a closure surface, the gas inlet extending through the connection head to an inlet port at the closure surface, the gas outlet extending through the connection head to an outlet port in the closure surface;
    an elongated housing for removably mating with the connection head along the closure surface, the housing having walls defining an internal cavity, the housing having an open end and an opposite end, the housing being removably attached to the connection head such that the closure surface sealingly covers the open end;
    a distribution tube disposed within the cavity and extending from the inlet port at the connection head through the opposite end of the housing, the distribution tube having one end defining an inlet in communication with the gas inlet of the connection head, the distribution tube having an other, threaded end which is closed and sealingly fixed to the housing by a cap threaded onto the tube from outside the housing;
    a plurality of openings in the distribution tube defining an outlet from the distribution tube disposed within the housing near the opposite end, the distribution tube thus defining an internal passageway between the inlet and the outlet;

a desiccant material disposed within the cavity and completely filling the cavity between the distribution tube and the housing; and, a retaining means for holding in place the desiccant material while allowing passage of gas, the retaining means being disposed at the open end of the housing, the retaining means including a screen member removably attached to the housing adjacent the connection head, the screen member retaining the desiccant when the housing is removed from the connection head, whereby the desiccant material can be regenerated by baking the housing with the desiccant therein, the screen member also permitting replacement of the desiccant material and reuse of the housing, the screen member including a wire mesh and a support removably attached to the distribution tube for holding the wire mesh within the cavity.

2. The apparatus according to claim 1, wherein the distribution tube is disposed substantially centrally within the cavity.

3. The apparatus according to claim 1, wherein the elongated housing defines an elongation axis in a direction of elongation, and the distribution tube is disposed substantially along the elongation axis.

4. The apparatus according to claim 1, further comprising sealing means for preventing leakage of the gas at the opposite end of the housing.

5. The apparatus according to claim 1, wherein a portion of the support extends through the inlet port and is disposed within the gas inlet.

6. The apparatus according to claim 5, further comprising sealing means for preventing leakage of the pressurized gas between the gas inlet and the support.

7. The apparatus according to claim 1, further comprising screen means at the outlet of the distribution tube for preventing the desiccant material from entering said outlet.

8. The apparatus according to claim 7, wherein the outlet in the distribution tube defines a plurality of orifices and the screen means is disposed in the distribution tube adjacent the orifices.

9. The apparatus according to claim 1, wherein the desiccant material comprises at least one of silica gel particles, activated alumina and molecular sieve material.

10. The apparatus according to claim 1, wherein the housing is substantially cylindrical and is threaded for removable attachment to the connection head, and the distribution tube and retaining means are removable by unthreading said cap.

11. The apparatus according to claim 1, further comprising sealing means for preventing leakage of the pressurized gas between the housing and the connection head.

12. A reusable desiccant apparatus for removing moisture from a gas, comprising:

a connection head defining a gas inlet and a gas outlet for sealed attachment along a gas line, the connection head being partitioned to separate the gas inlet and the gas outlet and defining a closure surface, the gas inlet being directed centrally downward to an inlet port along the closure surface, the gas outlet being directed from at least one outlet at a lateral side of the closure surface, through the connection head;

an elongated cylindrical housing threaded to and removably and sealingly mating with the connection head along the closure surface, the housing having walls defining an internal cavity, the walls defining an open end at the closure surface, sealed to the connection head, and continuous inner surfaces leading to a hole in a bottom of the housing at an opposite end;

a distribution tube disposed centrally within the cavity and sealing with the inlet port at the connection head, the distribution tube extending through the hole at the opposite end of the housing and being threaded;

a threaded cap disposed on a portion of the distribution tube protruding through the hole in the housing and fixing the distribution tube rigidly to the housing at said hole;

a plurality of openings being defined in the distribution tube forming an outlet leading from the distribution tube into the housing near the opposite end;

a desiccant material completely filling the cavity between the distribution tube and the housing;

a retaining means bridging across the open end of the housing under the connection head, the retaining means including a screen and an apertured plate, said plate being fixed rigidly between the distribution tube and the inner surfaces of the housing, the retaining means holding in place the desiccant material while allowing passage of gas;

whereby the reusable desiccant apparatus can be removed as a unit for regeneration of the desiccant material, and can also be readily disassembled for replacement of the desiccant material and reuse of the housing and distribution tube.

* * * * *